US011584162B2

(12) United States Patent
Nicula et al.

(10) Patent No.: US 11,584,162 B2
(45) Date of Patent: Feb. 21, 2023

(54) PNEUMATIC TIRE

(71) Applicant: The Goodyear Tire & Rubber Company, Akron, OH (US)

(72) Inventors: Adrian Florin Nicula, Luxembourg (LU); Julien Alexandre Vaissaud, Arlon (BE); Peter Johann Cornelius Maus, Büllingen (BE); Baudouin Duchene, Bastogne (BE); Pierre Joseph Christian Bastin, Bigonville (LU); Paul Leclerc, Colmar-Berg (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 118 days.

(21) Appl. No.: 17/110,891

(22) Filed: Dec. 3, 2020

(65) Prior Publication Data
US 2021/0170793 A1    Jun. 10, 2021

Related U.S. Application Data

(60) Provisional application No. 62/943,420, filed on Dec. 4, 2019.

(51) Int. Cl.
*B60C 5/14* (2006.01)
*B60C 19/00* (2006.01)
*B60C 1/00* (2006.01)

(52) U.S. Cl.
CPC ............. *B60C 5/14* (2013.01); *B60C 1/0008* (2013.01); *B60C 19/002* (2013.01); *B60C 2200/04* (2013.01)

(58) Field of Classification Search
CPC ....... B60C 19/002; B60C 5/002; B60C 17/06; B60C 17/065; B60C 19/02; B60C 17/04
See application file for complete search history.

(56) References Cited

U.S. PATENT DOCUMENTS

| 8,888,939 B2 | 11/2014 | Bormann |
| 2011/0030865 A1 | 2/2011 | Folk et al. |
| 2011/0308706 A1 | 12/2011 | Sandstrom et al. |
| 2012/0125507 A1 | 5/2012 | Bormann et al. |

FOREIGN PATENT DOCUMENTS

| DE | 112016000556 T5 | 11/2017 |
| DE | 102016225552 A1 | 6/2018 |
| EP | 2067634 | * 6/2009 |

(Continued)

OTHER PUBLICATIONS https://www.merriam-webster.com/dictionary/coat, no date.*

(Continued)

*Primary Examiner* — Justin R Fischer
(74) *Attorney, Agent, or Firm* — Alvin T. Rockhill

(57) ABSTRACT

In a first aspect of the invention, a pneumatic tire is provided, the tire comprising two spaced apart bead portions, a tread portion, a pair of sidewalls extending radially inward from axially outer edges of the tread portion to join the respective bead portions, the axially outer edges of the tread portion defining a tread width, a carcass, an innerliner covering the carcass and defining a tire cavity, and a metal coated foam material attached to the innerliner within the tire cavity.

16 Claims, 4 Drawing Sheets

(56) References Cited

FOREIGN PATENT DOCUMENTS

| EP | 2505390 | * | 7/2009 |
|---|---|---|---|
| EP | 2397347 B1 | | 11/2011 |
| EP | 2433786 A2 | | 3/2012 |
| EP | 2457720 B1 | | 5/2012 |
| EP | 2457749 B1 | | 5/2012 |
| EP | 2554617 A2 | | 2/2013 |
| EP | 3431309 A1 | | 1/2019 |
| JP | 58-185305 | * | 10/1983 |
| WO | WO 2019/221874 | * | 11/2019 |

OTHER PUBLICATIONS

Extended European Search Report dated Mar. 25, 2021 for European Patent Application No. EP20210953 which is the European counterpart to the subject patent application.

* cited by examiner

PNEUMATIC TIRE

This application claims benefit of U.S. Provisional patent Application Ser. No. 62/943,420, filed on Dec. 4, 2019. The teachings of U.S. Provisional Patent Application Ser. No. 62/943,420 are incorporated herein by reference in their entirety.

FIELD OF THE INVENTION

The present invention is directed to a pneumatic tire comprising foam material.

BACKGROUND

Tires generate noise when driving. It is known in the art that at least a part of that noise may be dampened by including foam material within the tire cavity so as to dampen tire cavity noise. An example of such a noise dampening material is given in United States Patent Publication No. 20120125507 A1 in which a single layer of rubber foam is applied to the innerliner of a tire. However, relatively thick layers result in internal strains in the foam material due to flexing and bending, thereby resulting in limited durability as fatigue cracks may occur. Another drawback consists in the heat isolating effect of the foam material which may result in heat buildup, in particular in areas radially below the tread or belt. In other examples, such as in United States Patent Publication No. 20110030865 A1, tires are almost completely filled with foam. Filling essentially the whole tire cavity with foam is expensive and may also negatively affect cooling properties as well as driving performance of the tire. An example to avoid heat buildup caused by foam in the tire consists in providing a plurality of circumferentially spaced patches of foam material on the innerliner. However, this has the disadvantage of limiting noise dampening properties due to a reduced amount of foam and is also difficult to apply during manufacturing of the tire. Noise dampening has recently become of even more importance in view of the growing number of electric vehicles which generate very little engine noise and accordingly which do not appreciably mask tire noise. Since tire noise is more noticeable in the operation of electric vehicles, they should optimally be equipped with tires that generate very little noise so that tire noise is not as evident and so that an extremely quiet running vehicle is attained. In the world today, there continues to be a long felt need for tires that generate lower levels of noise during operation and there the demand for advanced noise cancellation technologies for pneumatic tires is higher than ever. However, significant room for improvement in this field of tire technology remains.

SUMMARY OF THE INVENTION

A first object of the invention may be to provide an advanced noise dampened pneumatic tire.

Another object of the invention may be to provide an advanced noise dampened pneumatic tire which is relatively easy to produce at a commercially viable cost.

Another object of the invention may be to provide an advanced noise dampened tire with limited heat buildup caused by foam material provided in the tire.

The scope of the present invention is defined by the independent claims. Preferred embodiments are listed in the dependent claims as well as in the following description.

Thus, in a first aspect of the invention, a pneumatic tire is provided, the pneumatic tire comprising two spaced apart bead portions, a tread portion, a pair of sidewalls extending radially inward from axially outer edges of the tread portion to join the respective bead portion(s), wherein the axially outer edges of the tread portion define a tread width, a carcass, an innerliner covering the carcass and defining a tire cavity, and an (at least partially) metal coated foam material attached to the innerliner within the tire cavity.

Providing foam material or in other words noise dampening foam material with a metal coating may help to reduce the heat buildup in a region where the foam is attached to the tire. Moreover, the metal coating may help to avoid special and expensive geometric shapes or arrangements of foam material in order to reduce heat buildup.

In an embodiment, the foam material is surface coated with metal. In particular, the (bulk) foam material is not completely coated throughout the foam material. Surface coating can be provided cost efficiently.

In another embodiment, the foam material as such (not considering the metal coating) is an open cell foam material and has optionally a density ranging from 0.01 to 0.5 g/cm$^3$, preferably from 0.02 to 0.2 g/cm$^3$. Such material has been found as desirable for noise damping purposes. Open cell dampening material is much more suitable for dampening noise and/or vibration than closed cell foam material. In particular, an acoustic attenuation of tire cavity resonance is supported by the noise damping features of the present invention. Open cell noise damping foam material shall however not be understood herein as covering fully reticulated foam which constitutes a three-dimensional net, substantially free of cells or cell walls. While such material may have relatively good ventilation properties, it is not best suitable for dampening noise. Moreover, the latter material is relatively expensive. Whenever reference is made to a foam density herein, such density does not consider the weight and volume of any metal coating.

In another embodiment, the open cell foam material comprises from 55% to 95% (or preferably from 60% to 90%) open cells (of all cells) in the material. An open cell can be understood as a cell having at least one aperture. In other words, open cells are not fully closed or not fully enclosed by a cell wall. Closed cell foam does not fall into the above range as most cells of this foam type are closed. Fully or almost fully reticulated foam does not fall under that range either as it has almost no walls and constitutes rather an open grid. Whether cells are open or not (i.e. closed) can for instance be determined by light microscopy, SEM or NMR. Cell sizes could typically range from 10 µm to 1 mm (maximum diameter).

In still another embodiment, the foam material can be comprised of one or more of the following: polyurethane foam, polyethylene foam, foam rubber, and the like. Suitable polyurethane foams are typically made by the polymerization of a diisocyanate and a polyol in the presence of a suitable blowing agent. A wide variety of rubber foams can be utilized in the practice of this invention with natural rubber, synthetic polyisoprene rubber, polybutadiene rubber, nitrile rubber, and styrene-butadiene rubber foams being commonly used. Such foam rubbers are typically made by foaming a natural or synthetic rubber latex with a chemical foaming agent. The chemical foaming agent will typically be an azo compound, such as azodicarbonamide, a hydrazine compound, a carbazide, a tetrazole, a nitroso compound, and/or a carbonate, such as sodium bicarbonate. Such foams are commercially available and are coatable with metal, such as aluminum or copper.

In still another embodiment, the foam material is a foam strip material, wherein the foam strip material is circumferentially attached to the innerliner within the tire cavity.

In yet another embodiment, the foam strip material has a radially inner side, a radially outer side, and two lateral sides, wherein at least the radially outer side attached to the innerliner is metal coated. This helps to conduct heat away from the relatively isolated interface between the innerliner and the foam strip material or foam strip.

In another embodiment, all sides of the foam strip material are coated.

In yet another embodiment, the lateral sides and the radially inner side are essentially free of metal coating. Thus, metal coating can be carried out cost efficiently on one side.

In still another embodiment, only one or more of the following sides are metal coated: the radially outer side and both lateral sides. The combination of coating only lateral (or axially face sides) and the radially outer side with metal may improve heat conduction away from the inner surface of the tire while leaving the radially inner surface of the foam material uncoated, allowing a slightly better noise adsorption than coating all sides of the foam material.

In still another embodiment, the metal coating has a thickness ranging from 10 μm to 500 μm, preferably from 20 μm to 300 μm.

In still another embodiment, the metal is one or more of: aluminum and copper. Coating with these metals can be done cost efficiently while still rendering good thermal conduction.

In still another embodiment, the tire comprises multiple layers of foam strip material attached on top of each other. This may have advantages over using a thick single strip resulting in stress which could result in material cracks. This may be of particular relevance, when the foam material is metal coated so that cracks could substantially impair heat conduction. Providing a plurality of layers of foam strip material on top of one another or in other words in a stacked manner or arrangement, may allow on the one hand to use same or similar strip material depending on the desired level of noise dampening and on the other hand to use the same or similar foam strip material for different tire sizes.

In still another embodiment, at least one surface of said layers contacting another layer is metal coated. Thus, the interface between two stacked layers may comprise a metal coating. It is possible that only one or both surfaces of the layers at the interface of two stacked layers are metal coated. This may further help to remove heat out of axially central portions of the layers.

In still another embodiment, at least one of the layers has one or more of: an axial width ranging from 20% (preferably 30%) to 80%, even more preferably from 50% to 70%, of the tread width, a radial thickness ranging from 5% to 20% of the tread width. In addition, or alternatively, said layers may fill together from 8% (preferably 15%) to 40% of the volume of the tire cavity, even more preferably from 20% to 35%, of the volume of the tire cavity. The desired amount of foam material for the tire cavity has been found by the inventors to constitute a good compromise between material cost, covered space and/or dampening properties.

The term tire cavity, as mentioned herein, shall be the volume enclosed by the innerliner of the tire (especially in an unmounted and uninflated state), and closed by an (imaginary) circumferential ring-shaped (or hollow-cylindrical) plane contacting the radially innermost edges of both bead portions.

In still another embodiment, at least one of the layers is arranged essentially in parallel to the equatorial plane of the tire and has a length covering at least 80% of the inner circumference of the tire measured along the cross section with the equatorial plane of the tire. The metallic coating may allow to cover large areas of the tire while still allowing a relatively good heat conduction.

In still another embodiment, a first foam strip material layer attached to the innerliner has a smaller axial width than a second foam strip material layer arranged on top of the first foam strip material layer attached to the innerliner. This avoids stresses and reduces the probability of cracks, thereby helping to maintain a continuous coating of the metal material on the foam.

In still another embodiment, at least two of said layers are mechanically interlocked to one another along their length. Preferably, a first layer is attached (e.g. glued) to the innerliner by the radially inner surface of a male dove tail connector element of the first layer such that a slot is formed between the radially inner surface of the first layer and the innerliner (laterally beside the male dove tail connector element). Together with a metal coating of the radially outer side of the first layer, this may be an even more preferable embodiment as the slot and the metal coating help to avoid heat buildup below the tread of the tire.

In yet another embodiment, the foam material is essentially free of reticulated foam.

In still another embodiment, a radially outermost foam strip material layer is attached to the innerliner by at least one of a sealant material, adhesive, or glue. In another embodiment the tire is free of sealant material.

In still another embodiment, the tire is one of: a truck tire, a bus tire, a passenger car tire. In particular in these types of tires, especially in case of electric vehicles of that sort, the invention may be of particular relevance.

In another embodiment, the density of an open cell noise damping foam strip material in a first layer contacting the innerliner is lower than the density of a second layer of open cell noise damping foam strip material attached to the first layer. Higher density may improve acoustic damping but allows for smaller thermal conduction which may negatively impact durability of the foam and/or the tire. A lower density open cell noise damping foam strip material may improve thermal conduction but has more limited acoustic damping characteristics.

In a further embodiment, the open cell noise damping foam strip material is adapted and/or used for dampening tire cavity noise, in particular in the range from 100 Hz to 300 Hz or in the range from 100 Hz to 200 Hz or from 200 Hz to 300 Hz.

In still another embodiment, said multiple layers are formed by a strip spirally wound on top of one another. An advantage of such an embodiment is the flexibility for application in mass production.

In still another embodiment, a first layer of said multiple layers has a first butt splice arranged at a first circumferential position of the tire cavity, and a second layer of said multiple layers has a second butt splice arranged at a second circumferential position of the tire cavity which is different from the first circumferential position. In other words, each layer may be made of a single piece of foam strip material provided in a circumferential direction within the tire cavity and closed at its two ends with a butt splice. In case of having just one butt splice in a tire having just a single layer of foam strip material (not in accordance with the present invention), the position of the splice may result in unbalances. Having multiple layers on top of each other with splices at different circumferential (or angular) positions helps to reduce such unbalances.

In another embodiment, the position of the second butt splice of the second layer is arranged at an angular position which is between 100° and 260°, optionally between 130° and 230°, circumferentially shifted (or rotated) from an angular position of the first butt splice of the first layer. This makes clear that an essentially opposite arrangement may be of particular interest, e.g. to avoid unbalances. Moreover, splices positioned at the bottom of a stack of layers are protected by the layers above as the splices are not provided at the same angular position. The probability of loosening of a whole foam strip is thereby further reduced compared to the provision of one relatively thick strip.

In yet another embodiment, the layers have one or more of: an axial width from 50% to 70% of the tread width and a radial thickness from 5% to 15% of the tread width and, optionally, fill together from 20% to 40% of the volume of the tire cavity. This combination of parameters has been found by the inventors as even more desirable. This does not necessarily mean (as for the broader ranges) that all layers have the same width and/or thickness.

In another embodiment, the layers are arranged essentially in parallel to the equatorial plane of the tire and have each a length covering at least 80% of the inner circumference of the tire, preferably at least 90% or at least 99%. In particular, the layers may be continuously arranged—either on top of each other or spirally wound.

In yet another embodiment, the number of layers is from 2 to 4 layers, preferably 2 or 3 layers. This number may provide a good compromise between flexibility and work amount needed to install the layers.

In yet another embodiment, a first layer attached to the innerliner is longer than a second layer attached onto the first layer. In particular, the length of the radially innermost circumferential surface of the second layer is smaller than the length of the radially innermost circumferential surface of the first layer. As both layers have different lengths, stresses onto the strip material are smaller than in the case of having a single relatively, radially thick layer.

In still another embodiment, a first foam strip layer attached to the innerliner has a smaller axial width than a second layer arranged on top of (or in other words radially inside of) the foam strip layer attached to the innerliner. Such an embodiment may help to improve the cooling of the tread and/or crown area of the tire as less insulating material is directly attached to the innerliner. Preferably, the second layer has an at least 20% larger width than the first layer attached to the innerliner, and optionally an at most 50% larger width than the first layer. Such an arrangement would not be possible with non-customized foam strip material when using only a single layer.

In still another embodiment, at least two of said layers are mechanically interlocked (or form fit), in other words connected to one another along their length. This allows avoidance of adhesive materials and glues, thereby reducing the ecological footprint and simplifying production. Preferably, said interlocking is essentially continuous over the length of the strip.

In still another embodiment, said layers are mechanically interlocked by one or more means for attachment such as one or more dove tail connections, one or more jigsaw connections, hook-and-loop fasteners (Velcro connections), plastic rivets, screws, and the like.

In yet another embodiment, at least two layers have one or more of: the same radial thickness and the same radial width, and wherein said multiple layers are optionally made of the same material. Such parameters may help to reduce costs and/or facilitate mounting.

In an embodiment, the tire is one of: a truck tire, a bus tire, a passenger car tire. In particular, vehicles having closed cabins may benefit from the invention as the noise level inside the passenger cabin can be reduced. For example, the tire is a bus tire for a rim size of 22.5 inch.

In a second aspect of the invention, a method of manufacturing a foam dampened pneumatic tire is provided, the method comprising the steps of: providing a pneumatic tire having a tire cavity; metal coating a foam strip; attaching the metal coated foam strip to the innerliner of the tire.

In an embodiment, the method further comprises the step of attaching a second foam strip layer and optionally a third foam strip layer to a radially inner side of the metal coated foam strip.

In another embodiment, the method further comprises applying the metal coating to the radially outermost surface of the foam strip and connecting the metal coated surface by an adhesive (for instance sealant or glue) to the innerliner of the tire.

In another embodiment, the method further comprises the step of providing a first strip of the open cell noise damping foam strip material and attaching the first strip circumferentially to the innerliner of the tire and optionally closing the first strip at its two ends by a butt splice.

In another embodiment, the method further comprises the step of providing a second strip of the open cell noise damping foam strip material and attaching the second strip circumferentially radially inwards onto the first strip and optionally closing the second strip at its two ends by a butt splice, wherein, optionally, the second strip is shorter than the first strip.

In another embodiment, the butt splice of the second layer is arranged at an angular position which is within the range of 100° to 260°, optionally within the range of 130° to 230°, circumferentially shifted (or rotated) from an angular position of the first butt splice of the first layer.

In another embodiment, providing a strip of open cell noise damping foam strip material, which is longer than the inner circumference of the tire, and spirally applying the strip in parallel to the equatorial plane of the tire so as to form at least two (or at least three) layers of the open cell noise damping foam strip material radially on top of one another.

The words damping and dampening shall be replaceable within the present disclosure. It is emphasized that one or more aspects, embodiments, or features thereof, maybe be combined with each other within the scope of the present invention.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
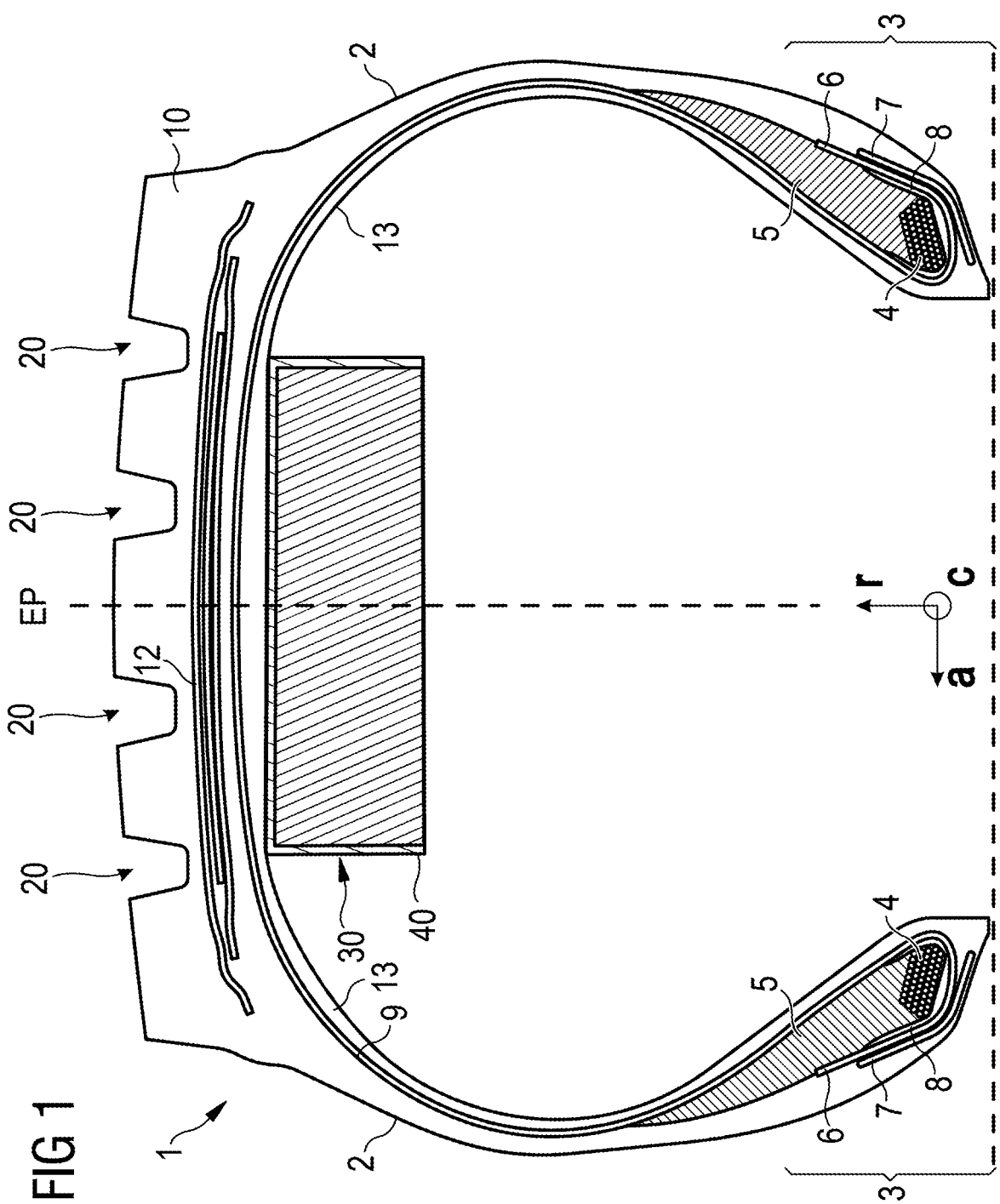
FIG. 1 shows a schematic cross-section of a truck or bus tire having a metal coated foam strip circumferentially arranged in the tire.

FIG. 1 is a schematic cross-section of a bus or truck tire 1. The tire 1 has a tread 10, an innerliner 13, a belt structure comprising a plurality of belt plies 12, a carcass ply 9, two sidewalls 2, and two bead regions 3 comprising bead filler apexes 5 and beads 4. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves 20, each groove essentially defining a U-shaped opening in the tread 10. In accordance with a first embodiment of the invention, the tire 1 has a circumferential layer 30 of a noise damping foam strip material, wherein the layer 30 is at least partially coated with a metal coating 40. In the depicted example, the radially outermost surface of the layer 30 and the two lateral sides of the layer 30 are metal coated. Preferably, said metal coating has a thickness ranging from 10 to 500 μm. As known in the art, metal coatings can be provided by various methods such as metallization, galvanic coating, sputtering, chemical vapor deposition, and/or foil coating.

The layer 30 is attached with the metal coated radially outer side to the radially inner side of the innerliner 13, preferably by means of a glue such as for example Loctite® from Henkel, for instance the 5900 series including 5900, 5910 and 5970. The layer 30 may preferably be essentially arranged in the circumferential direction in parallel to the equatorial plane EP of the tire 1. The radial direction r, the circumferential direction c and the axial direction a have been indicated for the sake for easier reference. It is noted however, that the depicted orientations of the axial direction a and the circumferential direction c shall not be limiting the invention. The volume covered by the two layer 30 is preferably at least 15% of the tire cavity volume but less than 40% of the latter. The volume of the tire cavity shall be understood as the volume enclosed by the innerliner of the tire (especially in an unmounted and uninflated state) and closed by an (imaginary) circumferential ring-shaped plane contacting the radially innermost edges of both bead portions 3. That plane is schematically shown in FIG. 1 by a dashed line connecting the radially innermost edges of the tire 1.

While the embodiment of FIG. 1 suggests a plurality of tire components including for instance apexes 5, chippers 7 and flippers 8, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves or a different number of belt plies than depicted.

Figure 2:
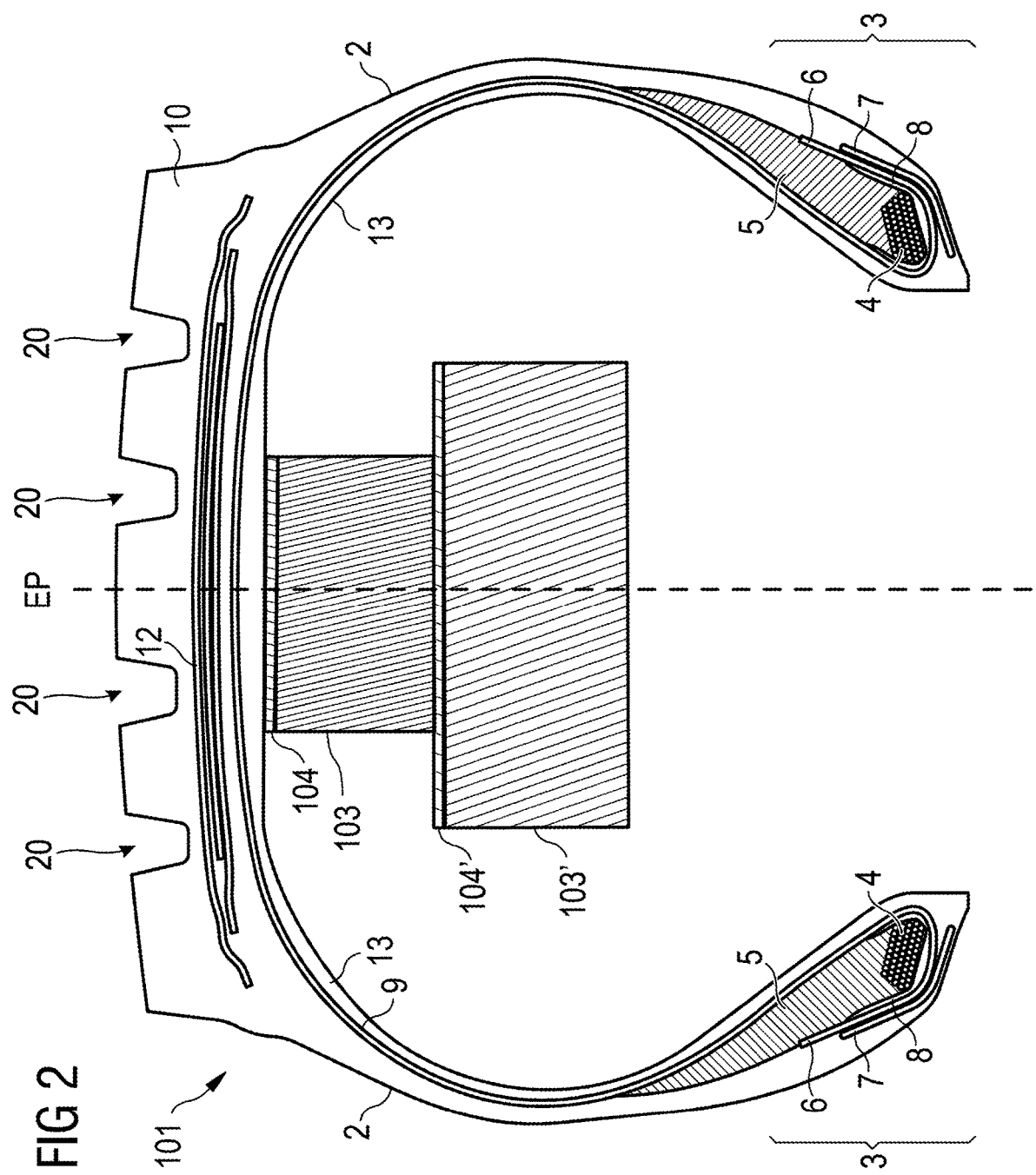
FIG. 2 shows a schematic cross-section of another tire having two metal coated layers of foam material with different axial width in accordance with another embodiment of the present invention.

FIG. 2 shows another example of a tire 101 which has multiple layers 103, 103' of open cell noise dampening foam strip material. For the sake of easier reference, the same reference numerals as in FIG. 1 have been used for other elements of the tire 101. The same applies to FIG. 3 as well. In contrast to the embodiment of FIG. 1, FIG. 2 shows a first layer 103 of open cell noise dampening foam strip material which has a first axial width and a second layer 103' which has a second, larger axial width than the first layer 103. This arrangement may help to improve cooling of the tire in an area below the tread 10. This effect may be further be improved by providing an open cell noise dampening foam strip material with a lower density in layer 103 than in layer 103'. Thus, layer 103' may have better noise dampening properties than layer 103 while allowing a better cooling of the tread area than in the arrangement shown in FIG. 1. Moreover, in accordance with the example of FIG. 2, the radially outer sides or surfaces of both layers 103 and 103' are covered by metal coatings 104, 104'. The metal coatings facing the innerliner 13 in combination with the relatively narrow outermost layer 103 improve significantly the heat conduction in an area radially below the tire tread 10. The second layer 103' can be attached to the first layer 103 by an adhesive which may be the same as the adhesive connecting the first layer 103 to the innerliner.

Figure 3:
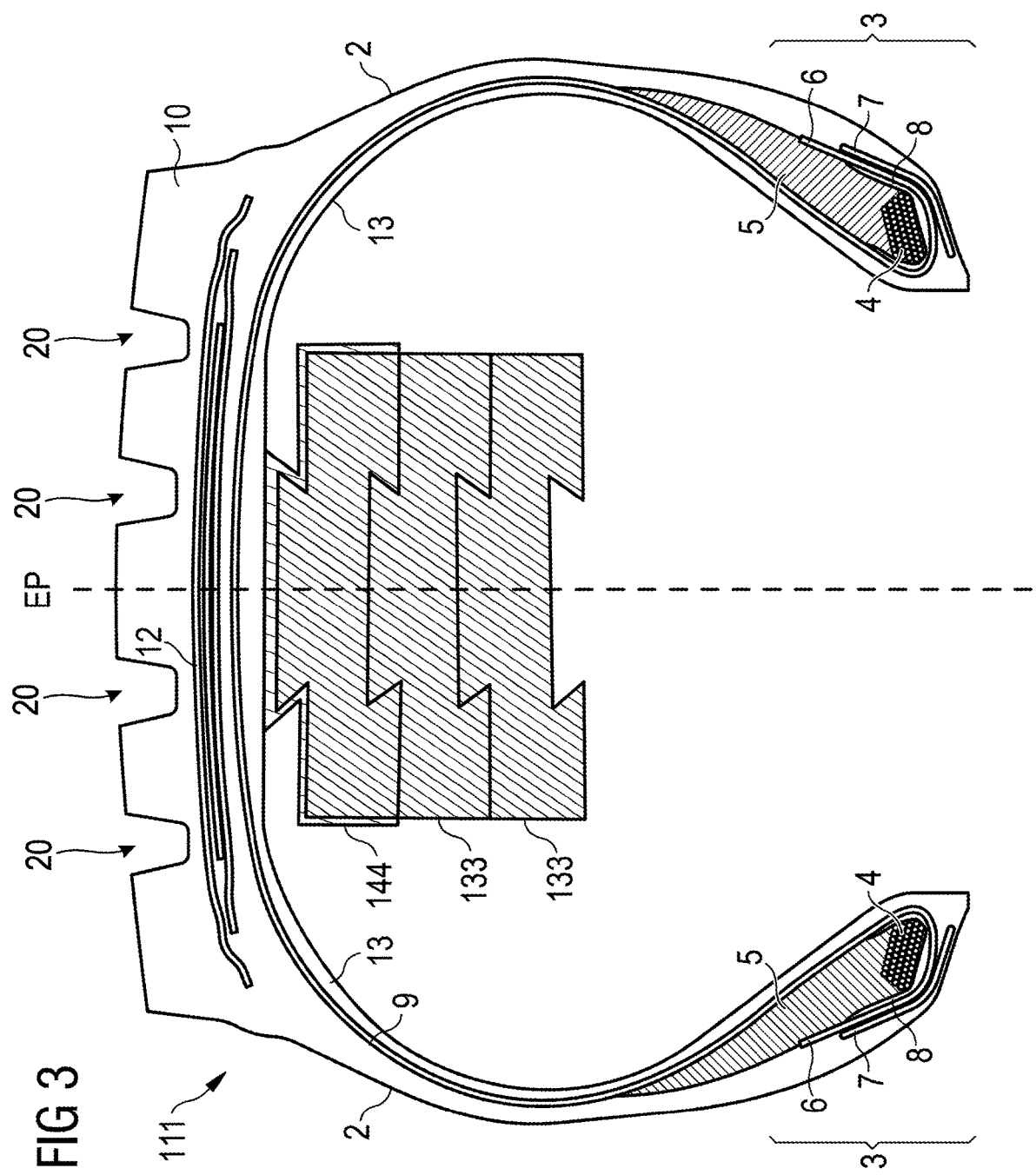
FIG. 3 shows a schematic cross-section of another tire having three mechanically interconnected layers of foam material connected along the strip length by dove tail connections, all in accordance with yet another embodiment of the present invention.

FIG. 3 shows yet another embodiment in accordance with the invention in which a tire 111 has three layers 133 of open cell noise dampening foam strip material. In particular, each layer 130 has on one side a male element and on its opposite side a female element for mechanically interconnecting or fitting layers between one another. This modular system allows easy adding of layers in dependence of the actual tire. Preferably, interconnecting elements are provided in a lateral center area of the layers 133. The radially outermost layer is coated with a metal coating 144 and connected to the innerliner only via the radially outermost surface of its male dove tail connector. Thus, a slot is formed between the innerliner 13 and the metal coated layer attached to the innerliner 13. The slot allows circulation of air and the metal layer 144 helps in addition to conduct heat out of the area of the slot. In this example, even the laterally outer sides of the outermost layer are covered by the metal coating. However, this is not mandatory.

Figure 4:
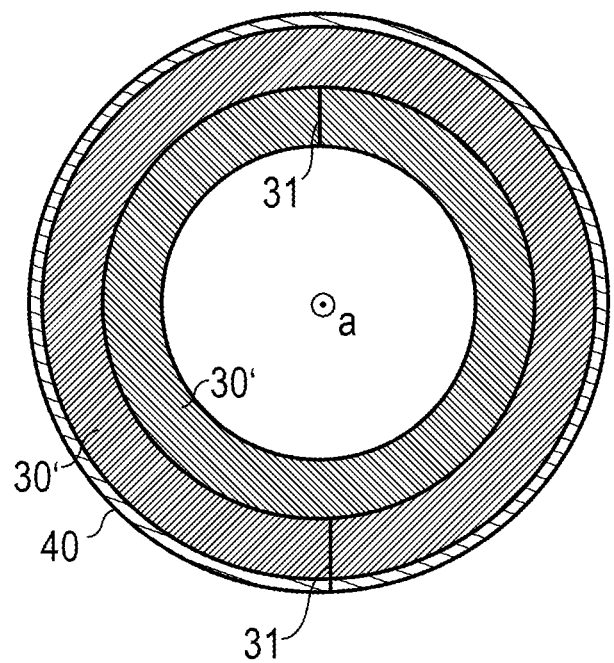
FIG. 4 shows a schematic cross-section in parallel to the equatorial plane of the tire showing two layers of open cell noise damping foam strip material, wherein each layer has a butt splice (the tire as such is not shown in this Figure).

As shown in FIG. 4, each layer of multiple layers may be wound in the circumferential direction, wherein each layer 30' may have a butt splice 31. Preferably, butt splices of different layers 30' are not positioned at same angular positions but are for instance mounted opposite to each other as shown in FIG. 4 (shifted by 180° with respect to the circumferential direction). For the sake of clarity, the tire as such is not shown in FIG. 4. The axial direction a is indicated in the center of the circumferentially arranged layers 30'.

Figure 5:
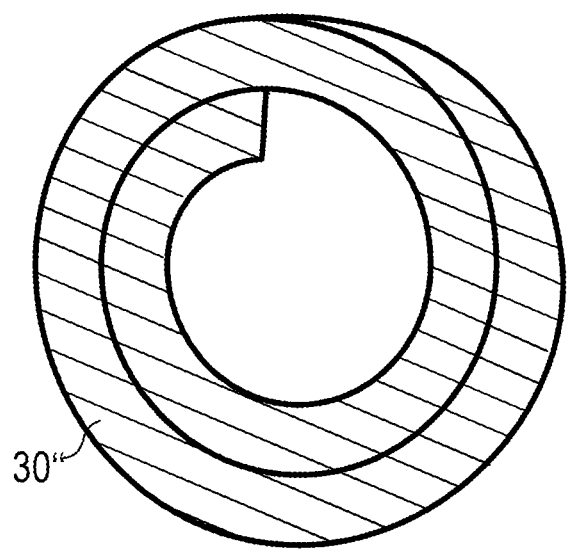
FIG. 5 shows a schematic cross-section in parallel to the equatorial plane of the tire showing two layers formed by a strip spirally wound radially on top of each other (the tire as such and the metal coating are not shown in this Figure).

Alternatively, as depicted in FIG. 5, multiple layers 30" could be spirally wound on top of each other. This limits the number of splices and simplifies mounting. As in other embodiments described herein, multiple layers 30" may be glued to one another. Alternatively, other means may be used such as adhesive tapes, Velcro connections or other types of mating or interlocking connections.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case the above described embodiments and examples shall not be understood in a limiting sense. In particular, the features of the above embodiments may also be replaced or combined with one another.

The invention claimed is:

1. A pneumatic tire comprising: two spaced apart bead portions; a tread portion; a pair of sidewalls extending radially inward from axially outer edges of the tread portion to join the respective bead portions, the axially outer edges of the tread portion defining a tread width; a carcass; an innerliner covering the carcass and defining a tire cavity; and an at least partially metal coated foam material attached to the innerliner within the tire cavity, wherein the metal coated foam material is an open-cell foam material surface coated with metal, wherein the metal coating has a thickness which is within the range of 10 μm to 300 μm, wherein the tire comprises multiple layers of foam strip material attached on top of each other with respect to the radial direction, and wherein at least one surface of said layers contacting another layer is metal coated.

2. The tire of claim 1 wherein the foam material as such has a density ranging from 0.01 g/cm$^3$ to 1 g/cm$^3$.

3. The tire of claim 1 wherein the foam material is selected from the group consisting of polyurethane foam, polyethylene foam, and foam rubber.

4. The tire of claim 1 wherein the radially outermost foam strip material is circumferentially attached to the innerliner within the tire cavity.

5. The tire of claim 4 wherein each layer of foam strip material has a radially inner side, a radially outer side, and two lateral sides, and wherein at least the radially outer side of the radially outermost layer of foam strip material attached to the innerliner is at least partially metal coated.

6. The tire of claim 5 wherein one or more of the lateral sides and the radially inner side of the radially outermost layer of foam strip material are essentially free of metal coating.

7. The tire of claim 5 wherein no more than the radially outer side and the lateral sides of the radially outermost layer of foam strip material are metal coated.

8. The tire of claim 1 wherein the metal is selected from the group consisting of aluminum and copper.

9. The tire of claim 1 wherein at least one of the layers has one or more of: an axial width ranging from 20% to 80% of the tread width and a radial thickness ranging from 5% to 20% of the tread width.

10. The tire of claim 1 wherein said layers fill together from 8% to 40% of the volume of the tire cavity.

11. The tire of claim 1 wherein at least one of the layers is arranged essentially in parallel to the equatorial plane of the tire and has a length covering at least 80% of the inner circumference of the tire.

12. The tire of claim 1 wherein a first foam strip material layer attached to the innerliner has a smaller axial width than a second foam strip material layer arranged radially below on the first foam strip material layer attached to the innerliner.

13. The tire of claim 1 wherein at least two of said layers are mechanically interlocked to one another along their length and wherein a first layer is attached to the innerliner by the radially inner surface of a male dove tail connector element of the first layer such that a slot is formed between the radially inner surface of the first layer and the innerliner.

14. The tire of claim 1 wherein a radially outermost foam strip material layer is attached to the innerliner by at least one of sealant material and an adhesive.

15. The tire of claim 1 wherein the tire is a truck tire.

16. The tire of claim 1 wherein the tire is a passenger car tire.

* * * * *